(12) United States Patent
Girouard

(10) Patent No.: US 9,121,521 B2
(45) Date of Patent: Sep. 1, 2015

(54) VALVE WITH TEMPERATURE ACTIVATED TRIGGERS

(75) Inventor: Erick Girouard, Guelph (CA)

(73) Assignee: Emcara Gas Development Inc., Guelph, Ontario (CA)

( * ) Notice: Subject to any disclaimer, the term of this patent is extended or adjusted under 35 U.S.C. 154(b) by 668 days.

(21) Appl. No.: 13/321,590

(22) PCT Filed: May 19, 2010

(86) PCT No.: PCT/CA2010/000771
§ 371 (c)(1),
(2), (4) Date: Apr. 23, 2012

(87) PCT Pub. No.: WO2010/132997
PCT Pub. Date: Nov. 25, 2010

(65) Prior Publication Data
US 2012/0199764 A1  Aug. 9, 2012

Related U.S. Application Data

(60) Provisional application No. 61/179,516, filed on May 19, 2009.

(51) Int. Cl.
*F16K 31/02* (2006.01)
*F16K 31/00* (2006.01)
*F16K 17/38* (2006.01)

(52) U.S. Cl.
CPC ............... *F16K 31/002* (2013.01); *F16K 17/38* (2013.01)

(58) Field of Classification Search
CPC . F16K 31/002; F16K 31/025; F16K 99/0036; F16K 99/0038; F16K 17/38
USPC ............................ 251/11; 137/79; 169/56, 60
See application file for complete search history.

(56) References Cited

U.S. PATENT DOCUMENTS 3,643,913 A * 2/1972 McIntosh ......................... 251/11
3,845,931 A * 11/1974 Pimentel ......................... 251/11
(Continued)

FOREIGN PATENT DOCUMENTS

DE  19802639 A1  7/1999
EP  0978297 A3  2/2000
(Continued)

OTHER PUBLICATIONS

International Search Report dated Jul. 19, 2010 from PCT/CA2010/000771.

*Primary Examiner* — Eric Keasel
(74) *Attorney, Agent, or Firm* — Ohlandt, Greeley, Ruggiero & Perle, L.L.P.

(57) ABSTRACT

There is provided a valve comprising a body, a passageway, a sealing member, a trigger, and a temperature responsive trigger actuator. The passageway is defined by the body, wherein the passageway includes an inlet and an outlet. The sealing member is configured for movement between a closed position and an open position, wherein in the closed position, the sealing member prevents fluid communication between the inlet and outlet of the passageway, and in the open position, the inlet and the outlet of the passageway are in fluid communication. The trigger is configured for movement between a first trigger position and a second trigger position, wherein the trigger cooperates with the sealing member such that, when the trigger is disposed in the first trigger position, the trigger effects interference with movement of the sealing member from one of the open position and the closed position to the other one of the open position and the closed position, and when the trigger is disposed in the second trigger position, the interference effected by the trigger, is removed. The temperature responsive trigger actuator includes a plurality of point trigger actuator portions wherein each one of the plurality of point trigger actuator portions is characterized by a respective shape-changing temperature and is configured such that, for each one of the plurality of point trigger actuator portions, when the temperature of the point trigger actuator portion is below the respective shape-changing temperature, the point trigger actuator portion is disposed in a respective low temperature shape condition, and when the temperature of the point trigger actuator portion is at or above the respective shape-changing temperature, the point trigger actuator portion is disposed in a respective high temperature shape condition. The trigger co-operates with the plurality of point trigger actuator portions such that the movement of the trigger from the first trigger position to the second trigger position is configured to be effected by heating of at least one operative point trigger actuator portion, wherein each one of the at least one operative trigger portion is any one of the plurality of point trigger actuator portions, wherein the heating is sufficient to raise the temperature of each one of the at least one operative point trigger actuator portion above its respective shape-changing temperature.

19 Claims, 16 Drawing Sheets

(56) References Cited

U.S. PATENT DOCUMENTS

| | | | |
|---|---|---|---|
| 4,194,572 A | | 3/1980 | Thery ET AL |
| 4,973,024 A | | 11/1990 | Homma |
| 5,788,212 A | | 8/1998 | Hackman et al. |
| 5,901,741 A | * | 5/1999 | Mudd et al. ............ 251/11 |
| 6,269,830 B1 | | 8/2001 | Ingle |
| 6,732,516 B2 | | 5/2004 | Butera et al. |
| 7,182,101 B2 | | 2/2007 | Alacqua et al. |
| 2009/0009026 A1 | | 1/2009 | Biasiotto et al. |

FOREIGN PATENT DOCUMENTS

| | | |
|---|---|---|
| GB | 2021265 A | 11/1979 |
| GB | 2128084 A | 4/1984 |
| WO | 9108022 A1 | 6/1991 |
| WO | 9744874 A1 | 11/1997 |

* cited by examiner

Figure IV

VALVE WITH TEMPERATURE ACTIVATED TRIGGERS

TECHNICAL FIELD

A temperature activated trigger for opening a valve is provided to vent fluid from a tank.

BACKGROUND OF THE ART

Current pressure relief valve technology which utilize temperature activated triggers, including the use of shape memory alloys, are "point trigger" devices which only respond to fire or extreme heat that is capable of directly heating the pressure relief valve. These pressure relief valves only activate when the point trigger is heated. In some cases where the point trigger devices is mounted on a tank, fire or a heat source heats a different part of the tank without heating the point trigger and causes the tank to rupture before the pressure relief valve is triggered. This is a problem with large or long tanks or tanks that are partially obscured. Further, current pressure relief valve technology which utilizes a temperature activated trigger employ a short, stiff rod which is characterized by a certain shape-changing temperature, which shape-changing temperature is not necessarily a useful trigger temperature for a pressure relief valve.

SUMMARY OF THE INVENTION

In accordance with one aspect, there is provided a valve comprising a body, a passageway, a sealing member, a trigger, and a temperature responsive trigger actuator. The passageway is defined by the body, wherein the passageway includes an inlet and an outlet. The sealing member is configured for movement between a closed position and an open position, wherein in the closed position, the sealing member prevents fluid communication between the inlet and outlet of the passageway, and in the open position, the inlet and the outlet of the passageway are in fluid communication. The trigger is configured for movement between a first trigger position and a second trigger position, wherein the trigger cooperates with the sealing member such that, when the trigger is disposed in the first trigger position, the trigger effects interference with movement of the sealing member from one of the open position and the closed position to the other one of the open position and the closed position, and when the trigger is disposed in the second trigger position, the interference effected by the trigger, is removed. The temperature responsive trigger actuator includes a plurality of point trigger actuator portions wherein each one of the plurality of point trigger actuator portions is characterized by a respective shape-changing temperature and is configured such that, for each one of the plurality of point trigger actuator portions, when the temperature of the point trigger actuator portion is below the respective shape-changing temperature, the point trigger actuator portion is disposed in a respective low temperature shape condition, and when the temperature of the point trigger actuator portion is at or above the respective shape-changing temperature, the point trigger actuator portion is disposed in a respective high temperature shape condition. The trigger co-operates with the plurality of point trigger actuator portions such that the movement of the trigger from the first trigger position to the second trigger position is configured to be effected by heating of at least one operative point trigger actuator portion, wherein each one of the at least one operative trigger portion is any one of the plurality of point trigger actuator portions, wherein the heating is sufficient to raise the temperature of each one of the at least one operative point trigger actuator portion above its respective shape-changing temperature, such that the plurality of point trigger actuator portions provides at least one pair of spaced-apart trigger actuator portions, and each one of the at least one pair of spaced-apart trigger actuator portions is configured such that, for each one of the at least one pair of spaced-apart trigger actuator portions, a one of the spaced-apart trigger actuator portions is spaced apart from the other one of the spaced-apart trigger actuator portions by a spacing distance of at least eight (8) inches, wherein the spacing distance is measured along the axis of the temperature responsive trigger actuator.

In accordance with another aspect, there is provided a valve comprising a body, a passageway, a sealing member, a trigger, a temperature responsive trigger actuator, and a shape-changing temperature modification assembly. The passageway is defined by the body, and the passageway includes an inlet and an outlet. The sealing member is configured for movement between a closed position and an open position, wherein in the closed position, the sealing member prevents fluid communication between the inlet and outlet of the passageway, and in the open position, the inlet and the outlet of the passageway are in fluid communication. The trigger is configured for movement between a first trigger position and a second trigger position, wherein the trigger cooperates with the sealing member such that, when the trigger is disposed in the first trigger position, the trigger effects interference with movement of the sealing member from one of the open position and the closed position to the other one of the open position and the closed position, and when the trigger becomes disposed in the second trigger position, the interference, effected by the trigger, to the movement of the sealing member from the one of the open position and the closed position to the other one of the open position and the closed position, is removed. The temperature responsive trigger actuator includes at least one point trigger actuator portion, wherein each one of the at least one point trigger actuator portion is characterized by a respective shape-changing temperature and is configured such that, for each one of the at least one point trigger actuator portion, when the temperature of the point trigger actuator portion is below the respective shape-changing temperature, the point trigger actuator portion is disposed in a respective low temperature shape condition, and when the temperature of the point trigger actuator portion is at or above the respective shape-changing temperature, the point trigger actuator portion is disposed in a respective high temperature shape condition. The shape-changing temperature modification assembly effects application of a tensile force to the temperature responsive trigger actuator sufficient to effect a modification to the respective shape-changing temperature of at least one of the at least one point trigger actuator portion so as to provide at least one shape-changing temperature modified point trigger actuator portion, wherein each one of the at least one shape-changing temperature modified point trigger actuator portion is any one of the at least one point trigger actuator portion, and wherein each one of the at least one shape-changing temperature modified point trigger actuator portion includes a respective modified shape-changing temperature. The trigger co-operates with the temperature responsive trigger actuator such that the movement of the trigger from the closed position to the open position is configured to be effected by heating of at least one operative point trigger actuator portion, wherein each one of the at least one operative trigger portion is any one of the at least one shape-changing temperature modified point trigger actuator portion, wherein the heating is sufficient to raise the temperature of each one of the at least one operative point trigger actuator portion above its respective modified shape-changing temperature.

In accordance with another aspect of the present invention, there is provided a valve comprising: a body; a passageway, a sealing member, a trigger, a temperature responsive trigger actuator, an actuator retainer, and a biasing member. The passageway is defined by the body, and the passageway includes an inlet and an outlet. The sealing member is configured for movement between a closed position and an open position, wherein in the closed position, the sealing member prevents fluid communication between the inlet and outlet of the passageway, and in the open position, the inlet and the outlet of the passageway are in fluid communication. The trigger is configured for movement between a first trigger position and a second trigger position, wherein the trigger cooperates with the sealing member such that, when the trigger is disposed in the first trigger position, the trigger effects interference with movement of the sealing member from one of the open position and the closed position to the other one of the open position and the closed position, and when the trigger becomes disposed in the second trigger position, the interference, effected by the trigger, to the movement of the sealing member from the one of the open position and the closed position to the other one of the open position and the closed position is removed. The temperature responsive trigger actuator includes at least one point trigger actuator portion, wherein each one of the at least one point trigger actuator portion is characterized by a respective shape-changing temperature and is configured such that, for each one of the at least one point trigger actuator portion, when the temperature of the point trigger actuator portion is below the respective shape-changing temperature, the point trigger actuator portion is disposed in a respective low temperature shape condition, and when the temperature of the point trigger actuator portion is at or above the respective shape-changing temperature, the point trigger actuator portion is disposed in a respective high temperature shape condition. The actuator retainer is coupled to the temperature responsive trigger actuator. The biasing member effects application of a force to the temperature responsive trigger actuator, wherein the temperature responsive trigger actuator co-operates with the actuator retainer so as to effect opposition to the force applied by the biasing member such that a resulting tensile force is applied to the temperature responsive trigger actuator sufficient to effect a modification to the respective shape-changing temperature of at least one of the at least one point trigger actuator portion so as to provide at least one shape-changing temperature modified point trigger actuator portion, wherein each one of the at least one shape-changing temperature modified point trigger actuator portion is a one of the at least one point trigger actuator portion, and wherein each one of the at least one shape-changing temperature modified point trigger actuator portion includes a respective modified shape-changing temperature. The trigger co-operates with the temperature responsive trigger actuator such that the movement of the trigger from the one of the open position and the closed position to the other one of the open position and the closed position is configured to be effected by heating of at least one operative point trigger actuator portion, wherein each one of the at least one operative trigger portion is any one of the at least one shape-changing temperature modified point trigger actuator portion, wherein the heating is sufficient to raise the temperature of each one of the at least one operative point trigger actuator portion above its respective modified shape-changing temperature.

In a further aspect, there is provided a valve comprising: a body, a passageway, a sealing member, a trigger, and a temperature responsive trigger actuator. The passageway is defined by the body, and includes an inlet and an outlet. The sealing member is configured for movement between a closed position and an open position, wherein in the closed position, the sealing member prevents fluid communication between the inlet and outlet of the passageway, and in the open position, the inlet and the outlet of the passageway are in fluid communication. The trigger is configured for movement between a first trigger position and a second trigger position, wherein the trigger cooperates with the sealing member such that, when the trigger is disposed in the first trigger position, the trigger effects interference with movement of the sealing member from one of the open position and the closed position to the other one of the open position and the closed position, and when the trigger becomes disposed in the second trigger position, interference, effected by the trigger, to the movement of the sealing member from the one of the open position and the closed position to the other one of the open position and the closed position, is removed. The temperature responsive trigger actuator includes at least one point trigger actuator portion, wherein each one of the at least one point trigger actuator portion is characterized by a respective shape-changing temperature and is configured such that, for each one of the at least one point trigger actuator portion, when the temperature of the point trigger actuator portion is below the respective shape-changing temperature, the point trigger actuator portion is disposed in a respective low temperature shape condition, and when the temperature of the point trigger actuator portion is at or above the respective shape-changing temperature, the point trigger actuator portion is disposed in a respective high temperature shape condition. The temperature responsive trigger actuator further includes a length-reducible trigger actuator portion configured to change its spatial disposition in response to application of heat, and a retained trigger actuator portion which is coupled to an actuator retainer. The length-reducible trigger actuator portion is configured to form at least one arc with a minimum radius of at least one (1) inch. The trigger co-operates with the temperature responsive trigger actuator such that the movement of the trigger from the first trigger position to the second trigger position is configured to be effected by heating of at least one operative point trigger actuator portion, wherein each one of the at least one operative point trigger actuator portion is any one of the at least one point trigger actuator portion, wherein the heating is sufficient to raise the temperature of each one of the at least one operative point trigger actuator portion above its respective shape-changing temperature so as to effect a reduction in a length of the temperature responsive trigger actuator. The coupling of the retained trigger actuator portion to the actuator retainer effects substantial fixing of the spatial disposition of the retained trigger actuator portion relative to the body and thereby effect a resistance to a change in spatial disposition of the retained trigger actuator portion relative to the body such that any reduction in a length of the temperature responsive trigger actuator, effected by the heating of at least one operative point trigger actuator portion, translates to an operative change in the spatial disposition of a length-reducible actuator portion of the temperature responsive trigger actuator which thereby effects the movement of the trigger from the first trigger position to the second trigger position.

In a further aspect, there is provided a valve comprising: a body, a passageway, a sealing member, a trigger, and a temperature responsive trigger actuator. The passageway is defined by the body, and includes an inlet and an outlet. The sealing member is configured for movement between a closed position and an open position, wherein in the closed position, the sealing member prevents fluid communication between the inlet and outlet of the passageway, and in the open position, the inlet and the outlet of the passageway are in fluid communication. The trigger is configured for movement between a first trigger position and a second trigger position, wherein the trigger cooperates with the sealing member such that, when the trigger is disposed in the first trigger position, the trigger effects interference with movement of the sealing member from one of the open position and the closed position to the other one of the open position and the closed position, and when the trigger becomes disposed in the second trigger position, interference, effected by the trigger, to the movement of the sealing member from the one of the open position and the closed position to the other one of the open position and the closed position, is removed. The temperature responsive trigger actuator includes at least one point trigger actuator portion, wherein each one of the at least one point trigger actuator portion is characterized by a respective shape-changing temperature and is configured such that, for each one of the at least one point trigger actuator portion, when the temperature of the point trigger actuator portion is below the respective shape-changing temperature, the point trigger actuator portion is disposed in a respective low temperature shape condition, and when the temperature of the point trigger actuator portion is at or above the respective shape-changing temperature, the point trigger actuator portion is disposed in a respective high temperature shape condition. The temperature responsive trigger actuator further includes a length-reducible trigger actuator portion configured to change its spatial disposition in response to application of heat, and a retained trigger actuator portion which is coupled to an actuator retainer. At least a portion of the length-reducible trigger actuator portion is configured to elastically bend to form a bend of at least forty-five (45) degrees. The trigger co-operates with the temperature responsive trigger actuator such that the movement of the trigger from the first trigger position to the second trigger position is configured to be effected by heating of at least one operative point trigger actuator portion, wherein each one of the at least one operative point trigger actuator portion is any one of the at least one point trigger actuator portion, wherein the heating is sufficient to raise the temperature of each one of the at least one operative point trigger actuator portion above its respective shape-changing temperature so as to effect a reduction in a length of the temperature responsive trigger actuator. The coupling of the retained trigger actuator portion to the actuator retainer effects substantial fixing of the spatial disposition of the retained trigger actuator portion relative to the body and thereby effect a resistance to a change in spatial disposition of the retained trigger actuator portion relative to the body such that any reduction in a length of the temperature responsive trigger actuator, effected by the heating of at least one operative point trigger actuator portion, translates to an operative change in the spatial disposition of a length-reducible actuator portion of the temperature responsive trigger actuator which thereby effects the movement of the trigger from the first trigger position to the second trigger position.

In a further aspect, there is provided a valve comprising: a body, a passageway, a sealing member, a trigger, a temperature responsive trigger actuator, and a protective conduit. The passageway is defined by the body, and includes an inlet and an outlet. The sealing member is configured for movement between a closed position and an open position, wherein in the closed position, the sealing member prevents fluid communication between the inlet and outlet of the passageway, and in the open position, the inlet and the outlet of the passageway are in fluid communication. The trigger is configured for movement between a first trigger position and a second trigger position, wherein the trigger cooperates with the sealing member such that, when the trigger is disposed in the first trigger position, the trigger effects interference with movement of the sealing member from one of the open position and the closed position to the other one of the open position and the closed position, and when the trigger becomes disposed in the second trigger position, interference, effected by the trigger, to the movement of the sealing member from the one of the open position and the closed position to the other one of the open position and the closed position, is removed. The temperature responsive trigger actuator includes at least one point trigger actuator portion, wherein each one of the at least one point trigger actuator portion is characterized by a respective shape-changing temperature and is configured such that, for each one of the at least one point trigger actuator portion, when the temperature of the point trigger actuator portion is below the respective shape-changing temperature, the point trigger actuator portion is disposed in a respective low temperature shape condition, and when the temperature of the point trigger actuator portion is at or above the respective shape-changing temperature, the point trigger actuator portion is disposed in a respective high temperature shape condition. The protective conduit defines a passage, wherein the temperature responsive trigger actuator is disposed within the passage. The trigger co-operates with the temperature responsive trigger actuator such that the movement of the trigger from the first trigger position to the second trigger position is effected by heating of at least one operative point trigger actuator portion, wherein each one of the at least one operative point trigger actuator portion is any one of the at least one point trigger actuator portions, wherein the heating is sufficient to raise the temperature of each one of the at least one operative point trigger actuator portion above its respective shape-changing temperature so as to effect a reduction in a length of the temperature responsive trigger actuator.

DESCRIPTION OF THE DRAWINGS

The embodiments will now be described with reference to the following drawings, in which.

DETAILED DESCRIPTION

Figure 15:
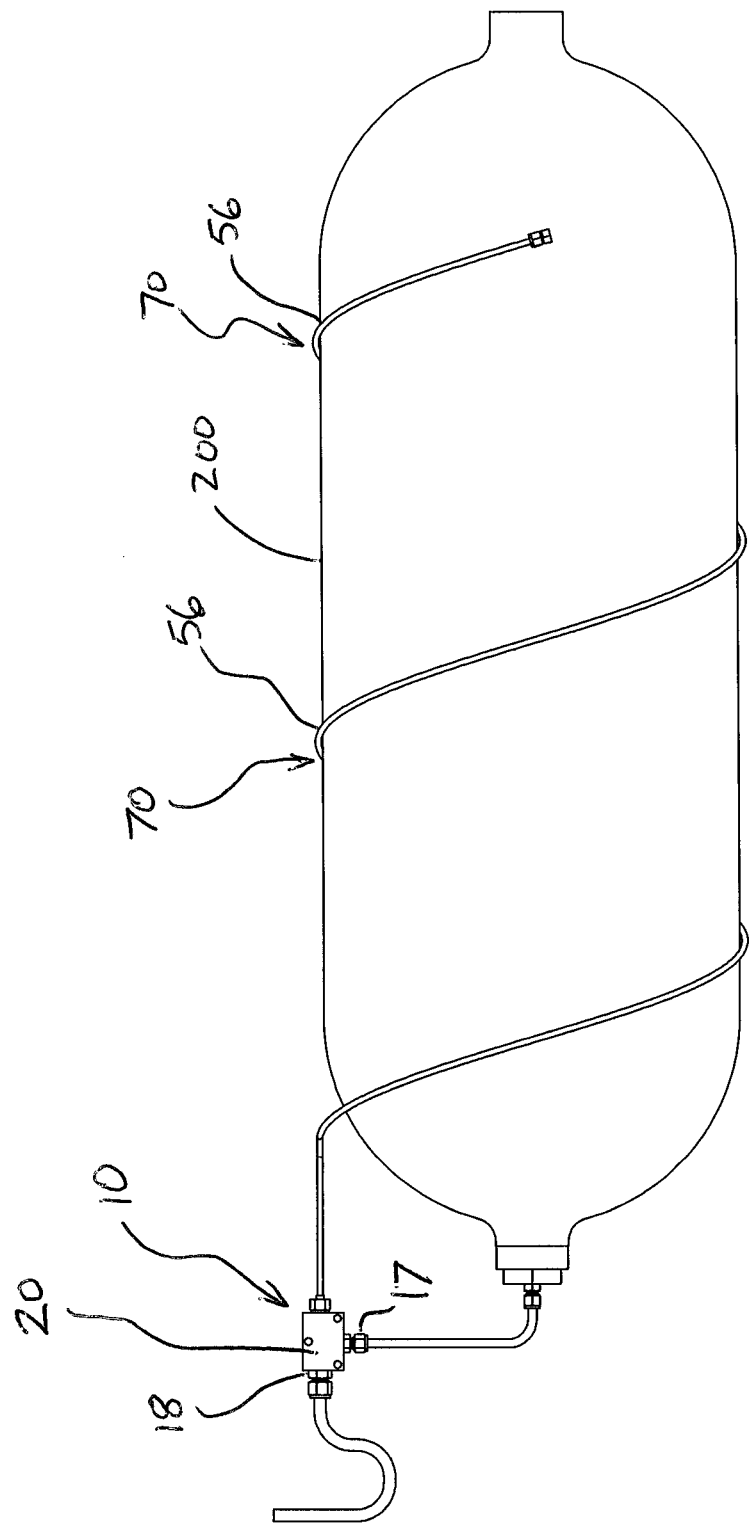
FIG. 15 is a side view of an embodiment of the valve of FIG. 1 attached to a tank.
Figure 16:
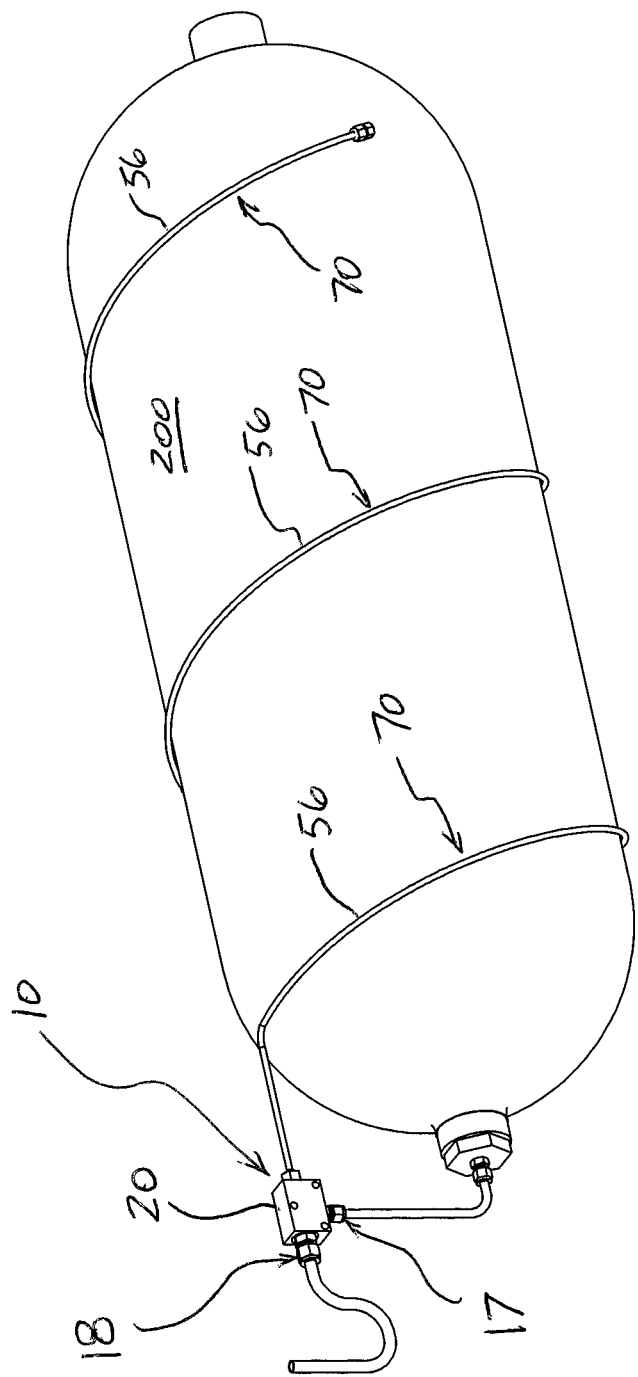
FIG. 16 is an isometric top view of the embodiment of the valve attached to a tank illustrated in FIG. 15.

Referring to FIGS. 1 to 8, there is provided an embodiment of a valve 10 for attachment, either directly or indirectly, to an opening of a container such as, for example, a vessel or tank containing liquids or gases held under pressure such as the tank 200 depicted in FIGS. 15 and 16. The valve 10 is configured to open when a predetermined threshold temperature is sensed. The valve 10 comprises a body 20, a passageway 30, a sealing member 160, a trigger 130 and a temperature responsive trigger actuator 100.

A second embodiment of the valve 10 is illustrated in FIGS. 9 to 14. Like reference numerals denote like components.

The valve 10 can be used in a variety of applications including, but not limited to, venting a pressure vessel when the vessel is exposed to extreme heat or fire in order to avoid an explosion, or venting a tank of fire suppressant onto a fire in the area protected by the trigger.

The body 20 includes a passageway 30 having an inlet 17 and an outlet 18. The inlet 17 can be configured for attachment to an opening of a container, either directly or indirectly. An embodiment of the invention attached indirectly to a tank 200 is illustrated in FIGS. 15 and 16. For example, the material of the body 20 is metallic. Suitable metallic materials include brass, aluminium, or stainless steel.

The sealing member 160 is configured for movement between a closed position and an open position. In the closed position, (see FIGS. 2 to 4 of the first embodiment, and FIGS. 10 and 11 of the second embodiment), the sealing member 160 prevents fluid communication between the inlet 17 and outlet 18 of the passageway 30 In the open position (see FIGS. 5 to 7 of the first embodiment, and FIGS. 12 and 13 of the second embodiment), the inlet 17 and the outlet 18 of the passageway are in fluid communication, allowing for gas or liquid to flow from the inlet 17 to the outlet 18. For example, the sealing member 160 is made from one or more of a variety of material including metal. For example, a suitable metal is steel.

Figure 2:
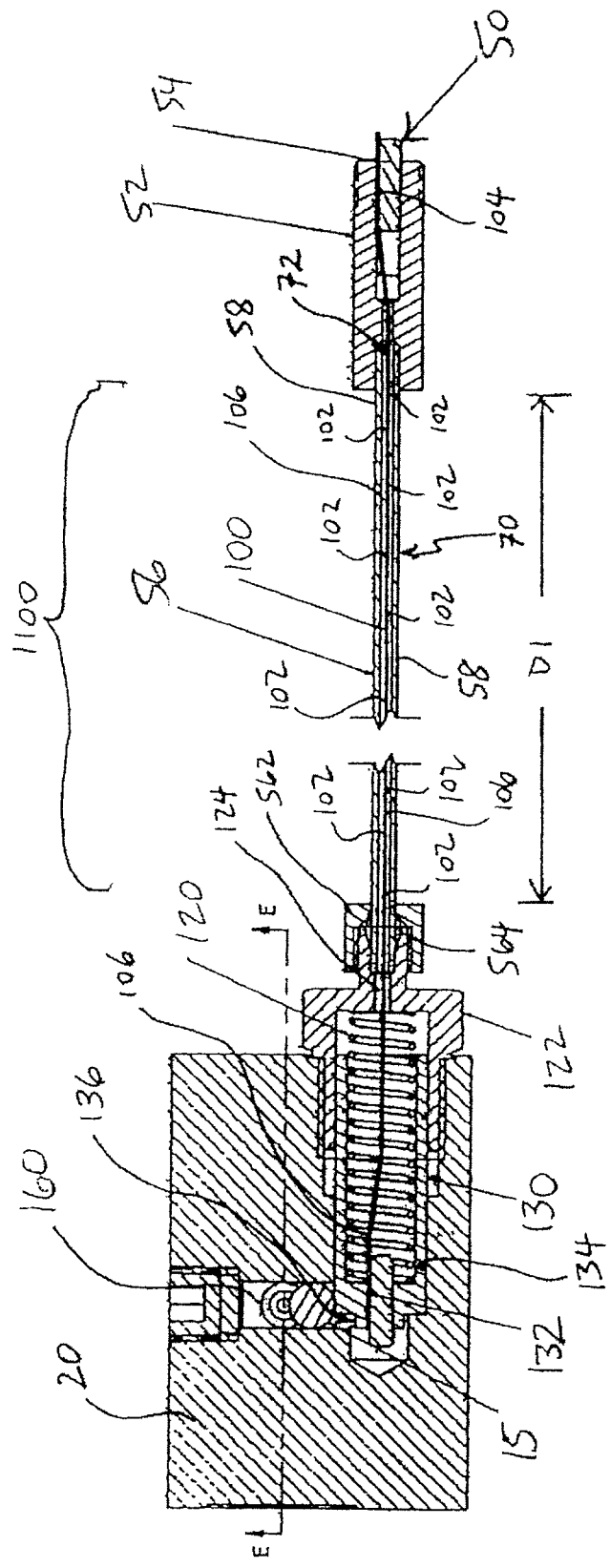
FIG. 2 is cross-sectional view of the valve of FIG. 1 as viewed from the plane B-B in FIG. 8 showing the sealing member in the closed position.
Figure 5:
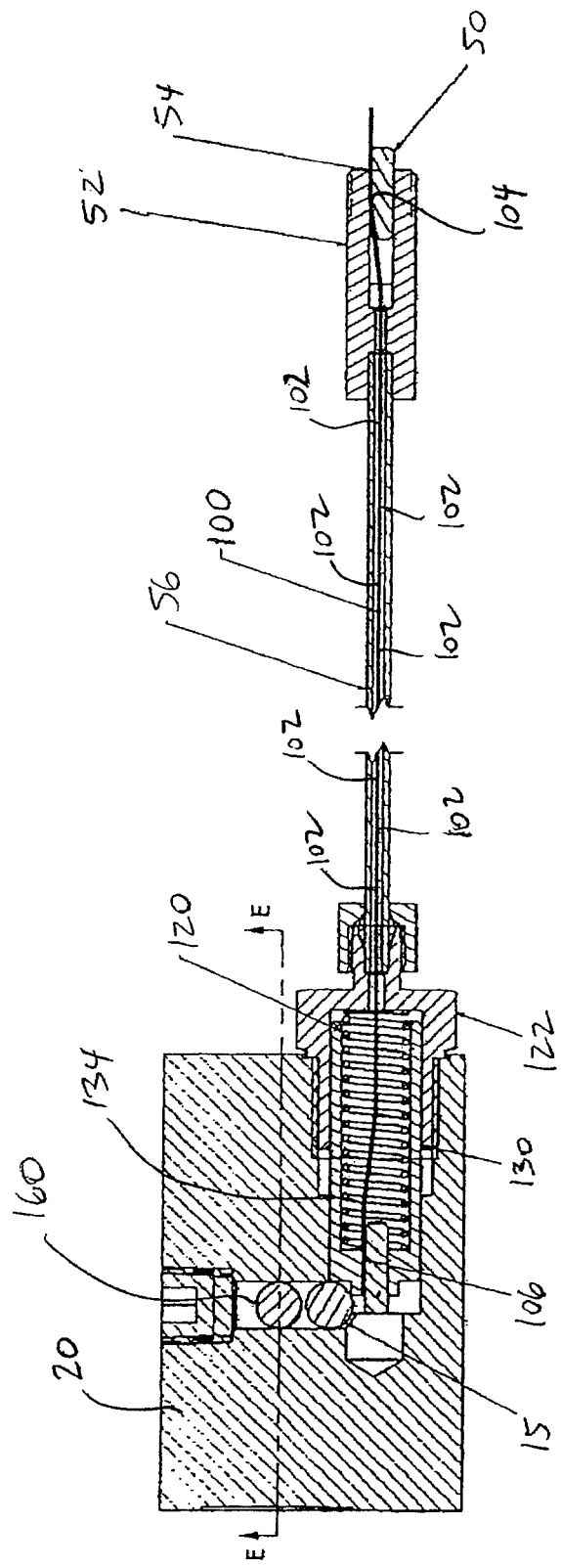
FIG. 5 is cross-sectional view of the valve of FIG. 1 as viewed from the plane B-B in FIG. 8 showing the sealing member in the open position.

Referring to FIGS. 2 and 5 of the first embodiment (FIGS. 10 and 12 of the second embodiment), in some embodiments, the body 20 also defines a passageway 136 which slideably receives the trigger 130, wherein the trigger is configured for slideable movement between the closed position and the open position within the passageway 136.

Figure 3:
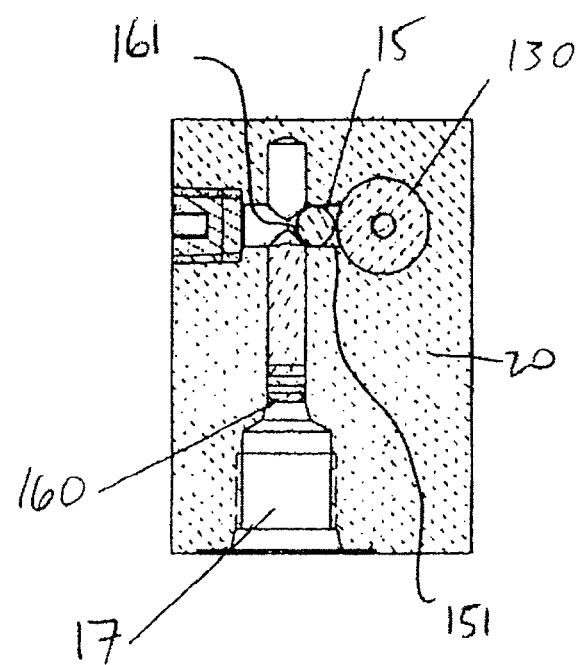
FIG. 3 is cross-sectional view of the valve of FIG. 1 as viewed from the plane C-C in FIG. 8 showing the sealing member in the closed position.
Figure 6:
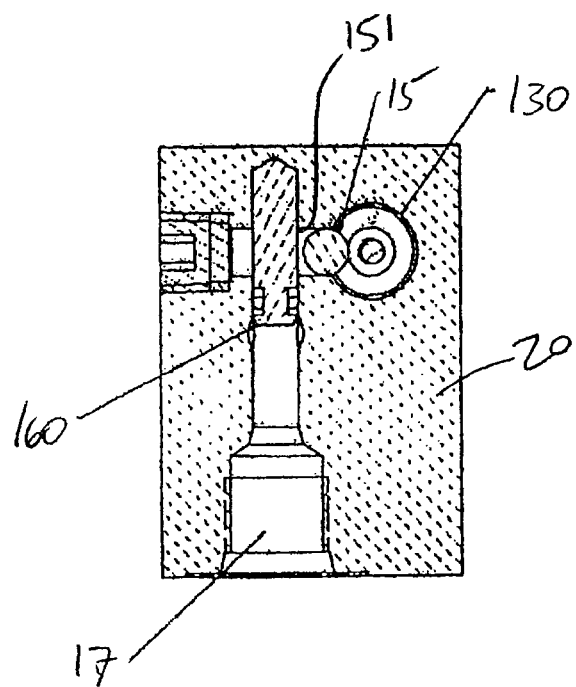
FIG. 6 is cross-sectional view of the valve of FIG. 1 as viewed from the plane C-C in FIG. 8 showing the sealing member in the open position.

As illustrated in FIGS. 2, 3, 5 and 6 of the first embodiment (FIGS. 10 to 13 of the second embodiment), the trigger 130 is configured for movement between a first trigger position and a second trigger position, and in the first trigger position, the trigger 130 effects interference with movement of the sealing member 160 from one of the open position and the closed position (in the case of the embodiments depicted in FIGS. 2 and 3, and in FIGS. 10 and 11 this is the closed position) to the other one of the open position and the closed position (in the case of the embodiments depicted in FIGS. 5 and 6 and FIGS. 12 and 13, this is the open position). Movement of the trigger 130 from the first trigger position, as depicted in FIGS. 2 and 3 of the first embodiment (FIGS. 10 and 11 of the second embodiment), to the second trigger position, as depicted in FIGS. 5 and 6 of the first embodiment (FIGS. 12 and 13 of the second embodiment), removes the interference effected by the trigger to the movement of the sealing member 160.

It is also contemplated that in other embodiments, the sealing member 160 may be disposed in the open position so long as the trigger 130 is disposed in the first trigger position, and the sealing member 160 is disposed for movement to the closed position when the trigger 130 is disposed in the second trigger position.

In some embodiments, such as depicted in FIGS. 5 and 6 of the first embodiment (FIGS. 12 and 13 of the second embodiment), when the trigger 130 is disposed in the second trigger position, the sealing member 160 is configured to move from the closed position to the open position in response to a sufficient pressure differential provided between the inlet 17 and the outlet 18.

In some embodiments, the movement of the trigger 130 from the first position to the second position can directly effect movement of the sealing member 160, whereas in other embodiments, as shown in FIGS. 2, 3, 4, 5 and 6 of the first embodiment (FIGS. 10 to 13 of the second embodiment), the movement of the trigger from the first position to the second position indirectly effects movement of the sealing member 160. In FIGS. 2 and 3 of the first embodiment (FIGS. 10 and 11 of the second embodiment), for example, the trigger 130 urges an intermediate member, in this case, a single ball 15, against the sealing member 160 and is thereby maintaining the sealing member 160 in one of the open position and the closed position (in this case, the closed position) by effecting interference with movement of the sealing member 160 to the other one of the open position and the closed position (in this case, the open position) by forces exerted by the fluid in the tank by communication effected with the contents of the tank by the inlet 17. In the embodiment shown in FIGS. 2, 3, 4, 5 and 6 of the first embodiment (FIGS. 10 to 13 of the second embodiment), the ball 15 is used to transmit most of the force applied to the sealing member 160, by the pressure exerted from the fluid contents of the tank, onto the body 20, while transmitting a smaller force onto the trigger 130. The use of the ball 15 as an intermediate member results in less frictional resistance to the trigger 130 when it is pulled by the temperature responsive trigger actuator 100, compared to when there is no intermediate member and the trigger 130 is directly engaged to the sealing member 160. This allows for greater flexibility in the choice of materials for the temperature responsive trigger actuator 100, which may, for example, be a wire comprised of shaped memory alloy. For example, the material of construction of the ball 15 is steel and the diameter of the ball is 0.250 inches.

In some embodiments, such as the first embodiment illustrated in FIGS. 2 to 8, the ball 15 is configured for urging by the trigger against an end 161 of the sealing member 160 to assume an interference relationship disposition with to the sealing member, wherein interference with the movement of the sealing member 160 from one of the open position and the closed position to the other one of the open position and the closed position is thereby effected.

In other embodiments, such as the second embodiment illustrated in FIGS. 9 to 14, the ball 15 is configured for urging by the trigger into a groove or cut-out 163 of the sealing member 160 to assume an interference relationship disposition with to the sealing member, wherein interference with the movement of the sealing member 160 from one of the open position and the closed position to the other one of the open position and the closed position is thereby effected. Relative to the first embodiment, the configuration of the interference relationship between the ball 15 and the sealing member 160 of the second embodiment facilitates the provision of a shorter sealing member 160, thereby reducing overall space requirements. As well, relative to the first embodiment, the configuration of the interference relationship between the ball 15 and the sealing member 160 of the second embodiment reduces the risk of inadvertent movement of the sealing member 160 (for example, inadvertent opening if the sealing member 160 is normally in a closed position, or, as another example, inadvertent closing if the sealing member 160 is normally in an open position) if the valve 10 is installed incorrectly such that a higher pressure is provided at the outlet 18 relative to the inlet 17.

In some embodiments, the ball 15 is disposed in a passage 151 which is drilled through the body 20. In the first embodiment, and comparing FIG. 3 with FIG. 4, or FIG. 6 with FIG. 7, the passage 151 is drilled separately from the outlet 18, and then plugged, and is disposed substantially orthogonally relative to the passage 151. In the second embodiment, and referring to FIG. 11 or FIG. 13, the passage 151 is drilled through the outlet 18. Relative to the first embodiment, the manner of formation of the passage 151 in the second embodiment reduces the number of manufacturing operations and the number of components.

Figure 4:
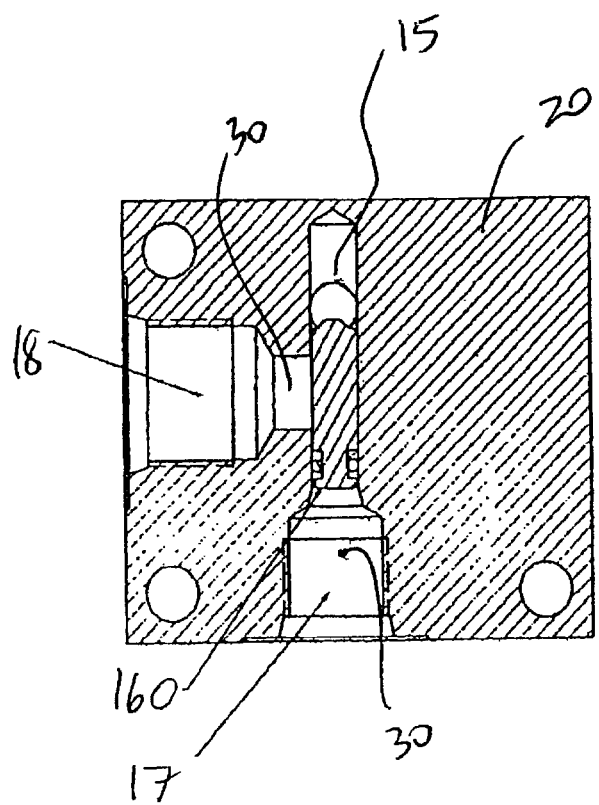
FIG. 4 is cross-sectional view of the valve of FIG. 1 as viewed from the plane E-E in FIG. 2 showing the sealing member in the closed position.
Figure 7:
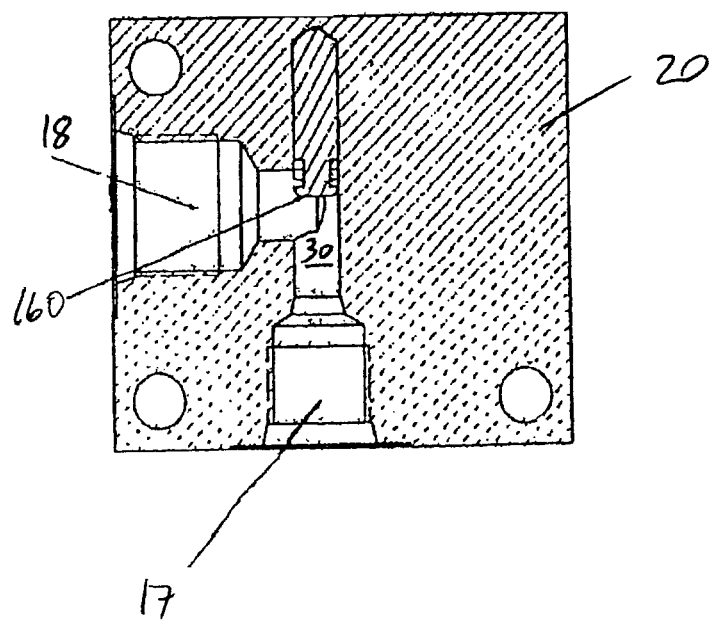
FIG. 7 is cross-sectional view of the valve of FIG. 1 as viewed from the plane E-E in FIG. 5 showing the sealing member in the open position.
Figure 8:
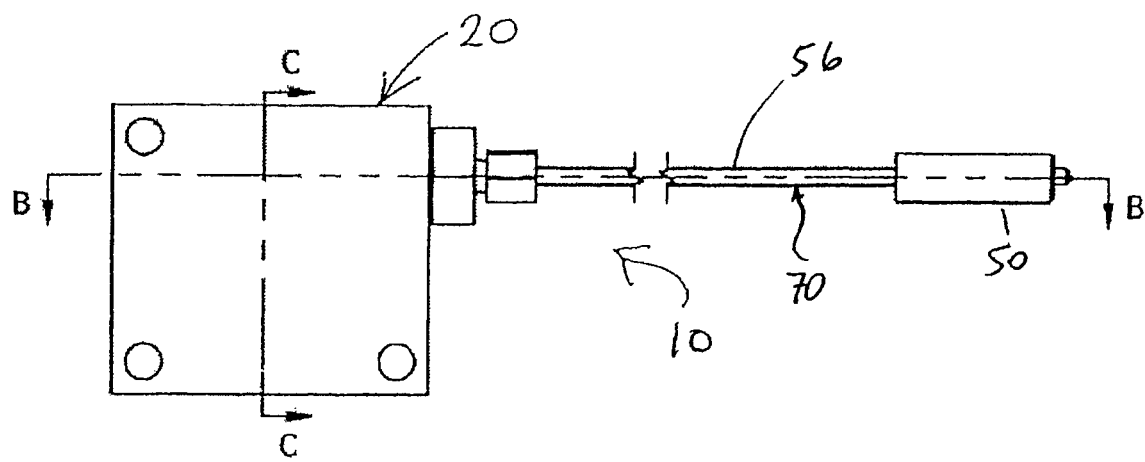
FIG. 8 is a top plan view of the valve of FIG. 1.
Figure 9:
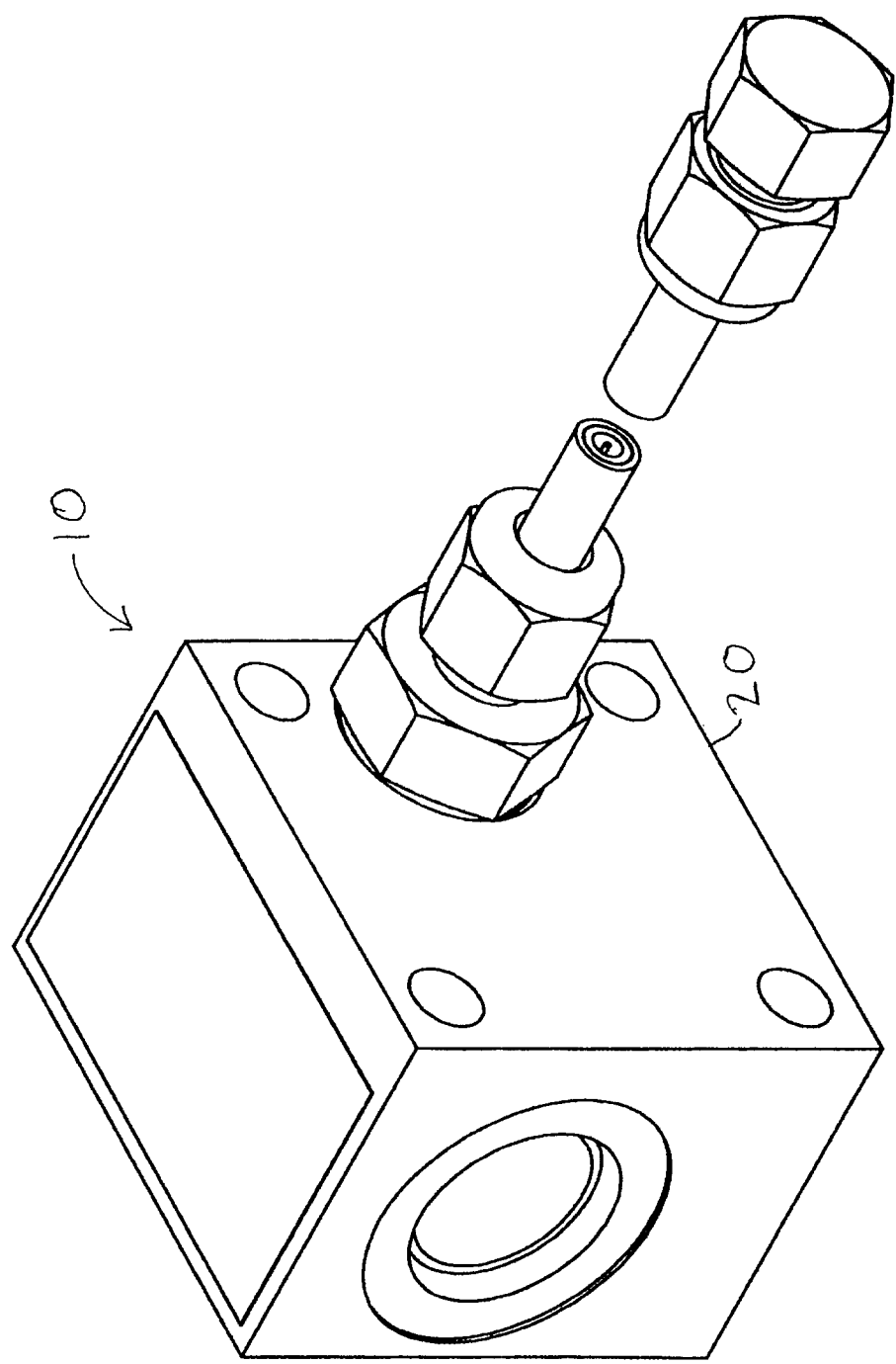
FIG. 9 is an isometric view of a second embodiment of a valve showing the temperature responsive trigger actuator partially in fragment.

In some embodiments, such as the embodiment illustrated in FIGS. 2 to 8 (or the second embodiment illustrated in FIGS. 10 to 14), the temperature responsive trigger actuator 100 co-operates with the trigger 130 such that the movement of the trigger 130 from the first trigger position to the second trigger position is effected as a result of the application of sufficient heat to the temperature responsive trigger actuator 100. As illustrated in FIGS. 2, 3 and 4 of the first embodiment (FIGS. 10 and 11 of the second embodiment), so long as the temperature responsive trigger actuator 100 is not exposed to sufficient heat, the temperature responsive trigger actuator 100 does not actuate movement of the trigger 130 and therefore the interference to the movement of the sealing member 160 in the closed position is maintained. When the temperature responsive trigger actuator 100 is exposed to sufficient heat, as illustrated in FIGS. 5, 6 and 7 of the first embodiment (FIGS. 12 and 13 of the second embodiment), the temperature responsive trigger actuator 100 effects the movement of the trigger 130 to the second trigger position and thereby removes the interference to the movement of the sealing member 160 from a closed position to an open position.

A fire or other heat source which can effect movement of the trigger 130 can also effect heating of the tank 200 to which the valve 10 is attached. In such cases, in an embodiment of the invention, the movement of the trigger 130 is effected by the heat before the heating of the tank 200 effects the failure of the tank 200. "Failure" of the tank 200 occurs when the integrity of the tank 200 is compromised, such as by, for example, rupturing, breaking or melting.

In some embodiment, the trigger 130 is coupled to the temperature responsive trigger actuator 100. In this respect, for example, the trigger 130 includes a pin 132 and spring housing portion 134 (to be described in further detail below), and the temperature responsive trigger actuator is in the form of a wire which is pinched between the pin 132 and the spring housing portion 134. For example, the material of the spring housing portion 134 is metallic. Suitable metallic materials include brass, aluminium, or stainless steel. For example, the material of the pin 132 is a metal, such as steel.

In some embodiments, the temperature responsive trigger actuator 100 is in the form of a wire. In some embodiments, the wire is made from a shaped memory alloy, such as nickel titanium or "Nitinol". For example, the diameter of the wire is between 0.015 inches and 0.02 inches. For example, the wire includes a maximum diameter of 0.030 inches. For applications requiring a longer temperature responsive trigger actuator, a larger diameter wire is preferred.

Referring to FIGS. 2 and 5 of the first embodiment (FIGS. 10 and 12 of the second embodiment), in some embodiments, the valve 10 also includes an actuator retainer 50 coupled to the temperature responsive trigger actuator 100. The actuator retainer 50 is coupled to a retained trigger actuator portion 104 and effects substantial fixing of the spatial disposition of the retained trigger actuator portion 104 relative to the body 20. Such connection of the retained trigger actuator portion 104 to the actuator retainer 50 effects a resistance to a change in spatial disposition of the retained portion 50 relative to the body such that any reduction in a length of the temperature responsive trigger actuator 100 effected by the heating of the temperature responsive trigger actuator translates to an operative change in the spatial disposition of a length-reducible trigger actuator portion 106 of the temperature responsive trigger actuator 100 which thereby effects the movement of the trigger 130 from the first trigger position to the second trigger position.

In some embodiments, for example, substantial fixing of the spatial disposition of the retained actuator portion 104 relative to the body 20 by the actuator retainer 50 is effected by the coupling of the actuator retainer 50 to the body 20 of the valve 10. In other embodiments, for example, the actuator retainer 50 effects coupling of the retained trigger actuator portion 104 of the temperature responsive trigger actuator 100 to a component other than the valve body 20. For example, in other embodiments, the actuator retainer 50 includes a strap, band or other fastener for securing an end portion of the temperature responsive trigger actuator 100 directly or indirectly to the tank 200 to which the valve 10 is connected. Such a fastener would also function to effect a substantial fixing of the spatial disposition of the coupling of a portion of the temperature responsive trigger actuator 100 relative to the body 20 of the valve 10.

In some embodiments, the actuator retainer 50 effects coupling of a retained trigger actuator portion 104 of the temperature responsive trigger actuator 100 to the body 20 by being coupled to the retained trigger actuator portion 104.

In some of these embodiments, such as the first embodiment illustrated in FIGS. 1 to 8, to effect coupling of the retained trigger actuator portion 104 of the temperature responsive trigger actuator 100 to the body 20, the actuator retainer 50 includes an end retainer 52, a pin 54 and a connector 56. The temperature responsive trigger actuator 100 is secured to the end retainer 52 with a pin 54. The pin 54 is press fit within the end retainer 52 and substantially fixes the disposition of the actuator 100 relative to the end retainer 52 by pinching the temperature responsive trigger actuator 100 against the end retainer 52. The end retainer 54 is coupled to the connector 56. The connector 56 extends between the end retainer 52 and the body 20 and is in turn coupled to the spring retainer 122 (to be described in further detail below) which is fastened to the body 20. For example, the end retainer 52 is made using metallic material, such as brass or stainless steel. For example, the pin 54 is made from metallic material, such as steel. For example, the connector 56 is also made from metallic material, and suitable metallic materials includes copper, stainless steel, brass or aluminium.

Figure 10:
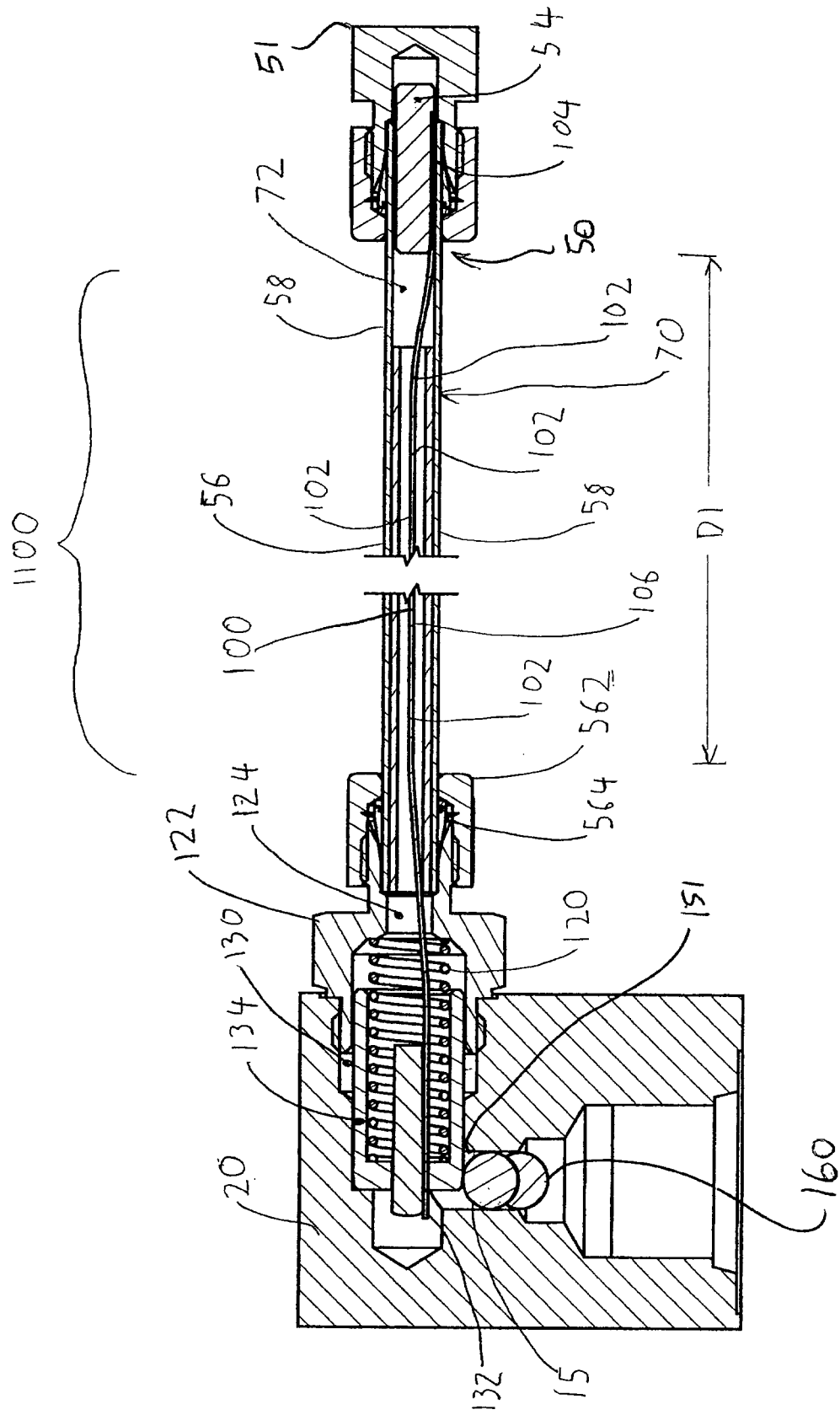
FIG. 10 is cross-sectional view of the valve of FIG. 9 as viewed from the plane C-C in FIG. 14 showing the sealing member in the closed position.
Figure 11:
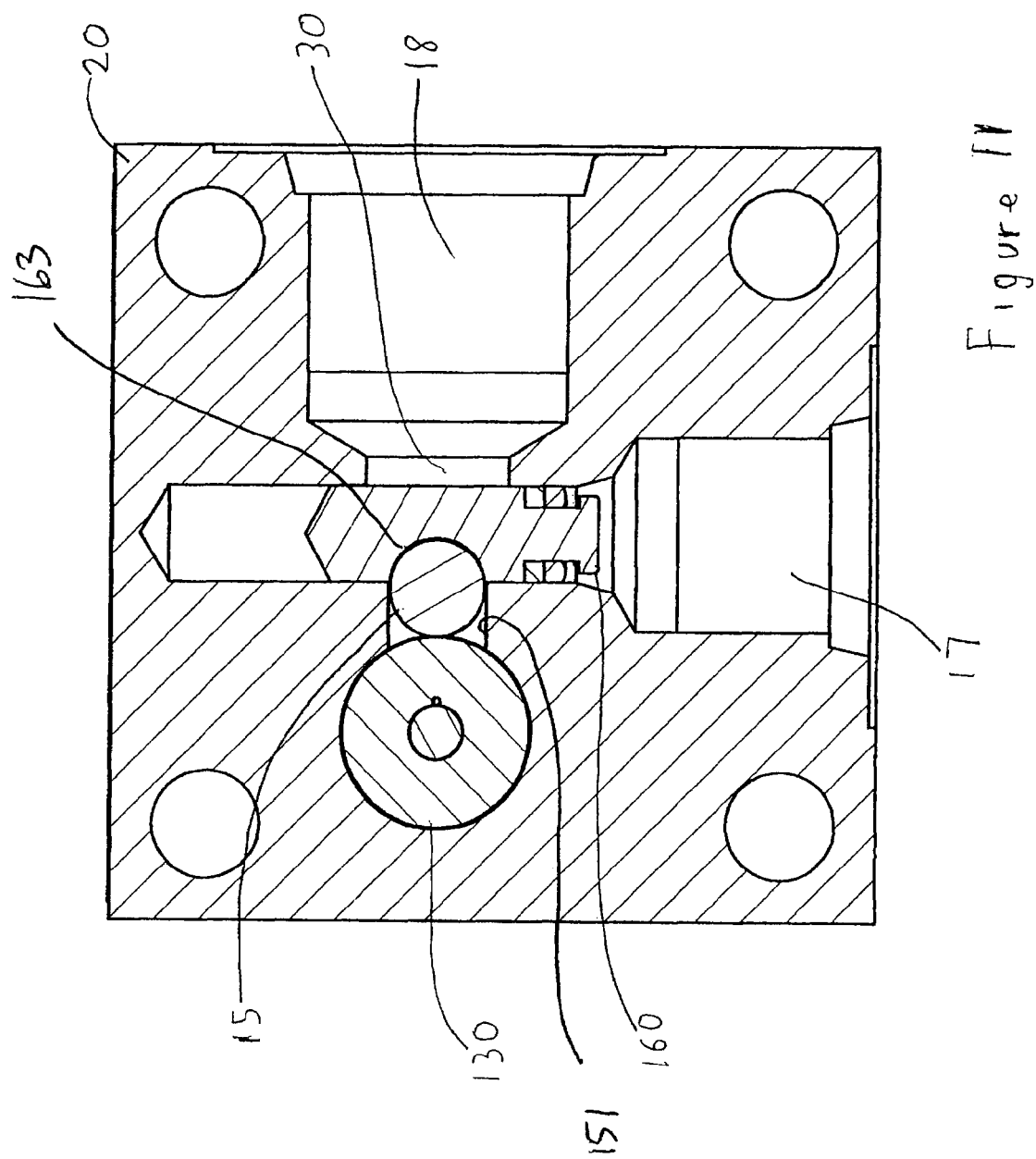
FIG. 11 is cross-sectional view of the valve of FIG. 9 as viewed from the plane B-B in FIG. 14 showing the sealing member in the closed position.
Figure 12:
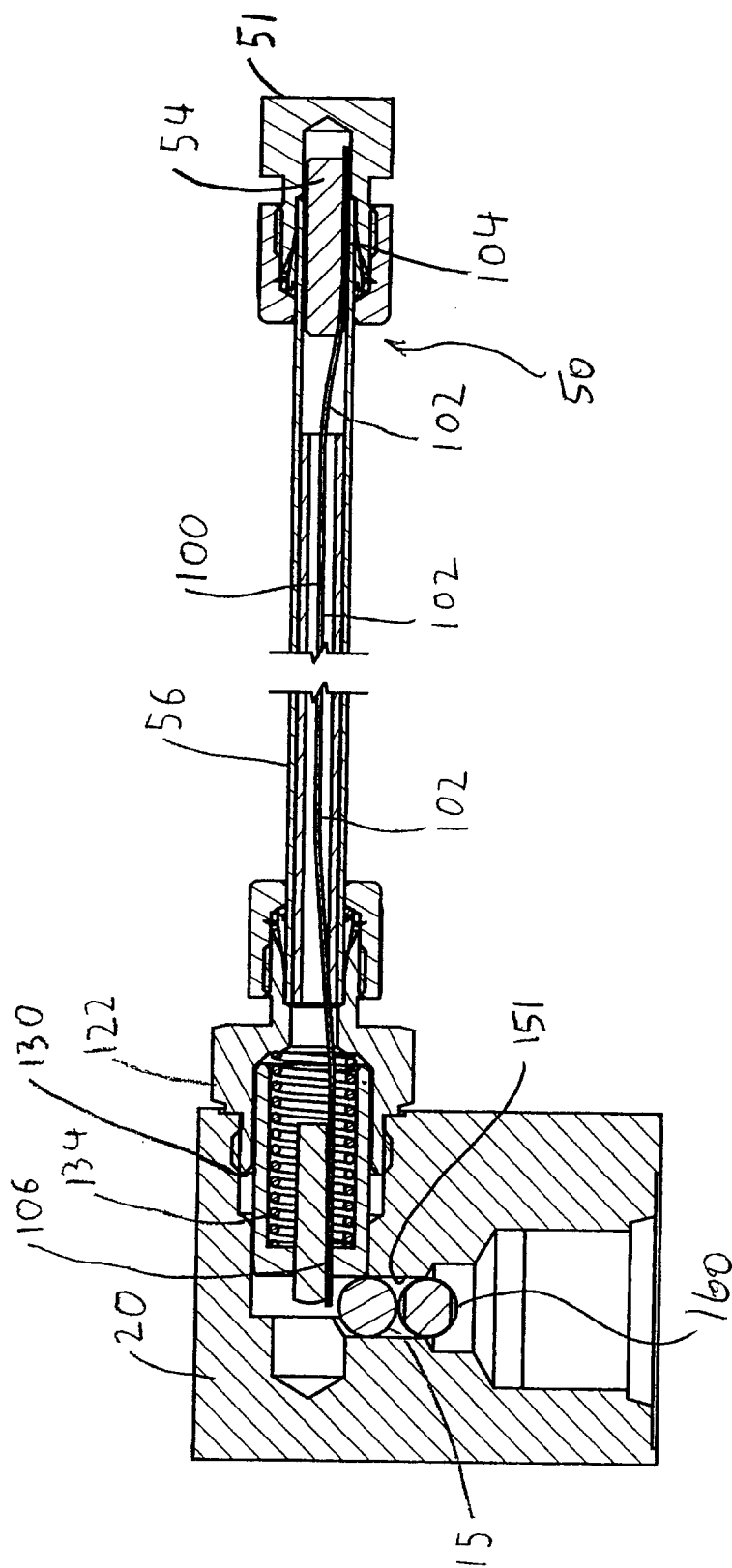
FIG. 12 is cross-sectional view of the valve of FIG. 9 as viewed from the plane C-C in FIG. 14 showing the sealing member in the open position.
Figure 13:
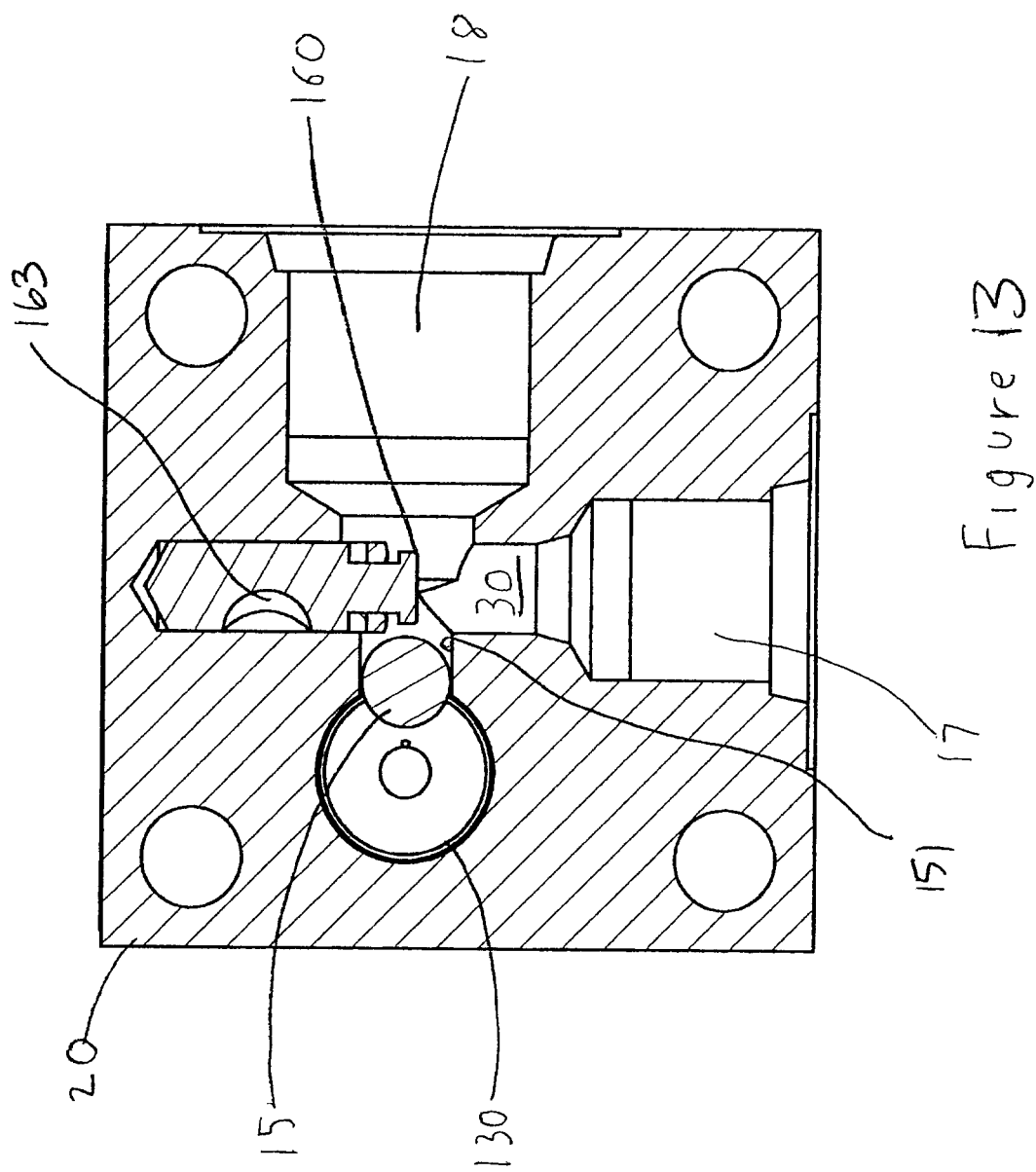
FIG. 13 is cross-sectional view of the valve of FIG. 9 as viewed from the plane B-B in FIG. 14 showing the sealing member in the open position.
Figure 14:
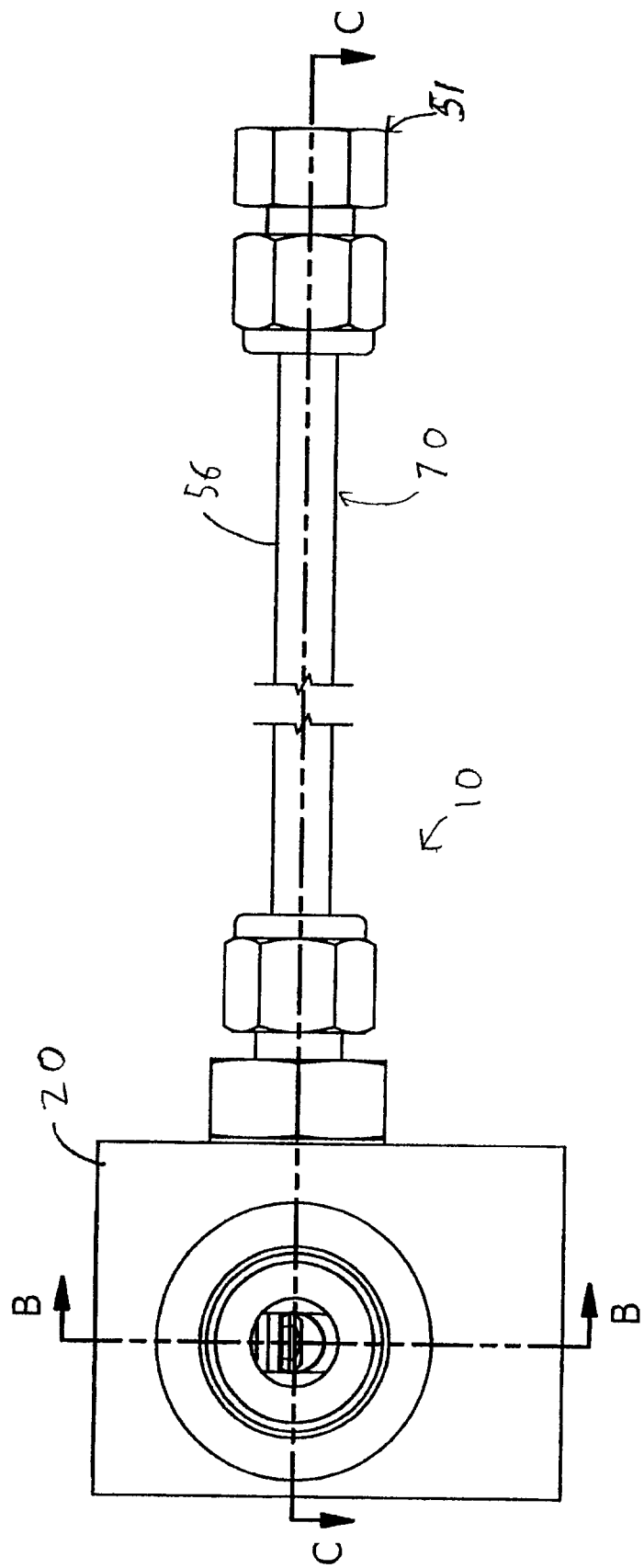
FIG. 14 is a top plan view of the valve of FIG. 9.

In other embodiments, such as the second embodiment illustrated in FIGS. 9 to 13, the actuator retainer 50 includes a connector 56 and a pin 54. Referring to FIGS. 10 and 12, the pin 54 is press fit within the distal end of connector 56 and substantially fixes the disposition of the actuator 100 relative to the distal end of connector 56 by pinching the temperature responsive trigger actuator 100 against the distal end of connector 56. In some embodiments, the connector 56 may be closed or covered by a cap 51. For example, the cap 51 is made using metallic material, such as brass or stainless steel. For example, the pin 54 is made from metallic material, such as steel. For example, the connector 56 is also made from metallic material, and suitable metallic materials includes copper, stainless steel, brass, aluminium, or a combination of said materials.

The actuator retainer 50 is coupled or connected to the retained actuator portion 104 of the temperature responsive trigger actuator 100, and such coupling or connection of the retained actuator portion 104 to the actuator retainer 50 effects a resistance to a change in spatial disposition of the retained portion 50 such that the reduction in a length of the temperature responsive trigger actuator 100 effected by the heating of the temperature responsive trigger actuator 100 translates to an operative change in the spatial disposition of a length-reducible trigger actuator portion 106 of the temperature responsive trigger actuator 100 which thereby effects the movement of the trigger 130 from the first trigger position to the second trigger position.

With respect to the actuator retainer 50, in some embodiments, the actuator retainer 50 is configured to compress by a distance which is less than 50% of the distance by which the temperature responsive trigger actuator stretches in response to tension applied to the temperature responsive trigger actuator. For example, the ratio of the stiffness of the actuator retainer along its longitudinal axis to the stiffness of the temperature responsive trigger actuator along its longitudinal axis is at least two (2).

First Aspect

In a first aspect, the temperature responsive trigger actuator 100 includes a plurality of point trigger actuator portions wherein each one of the plurality of point trigger actuator portions is characterized by a respective shape-changing temperature. In some embodiments of the invention, the respective shape-changing temperature is between 90 and 95 degrees Celsius. The trigger 130 co-operates with the plurality of point trigger actuator portions 102 such that the movement of the trigger 130 from the first trigger position to the second trigger position is configured to be effected by heating of at least one operative point trigger actuator portion, wherein the heating is sufficient to raise the temperature of each one of the at least one operative point trigger actuator portion above its respective shape-changing temperature. Each one of the at least one operative point trigger actuator portion is any one of the plurality of point trigger actuator portions 102.

The plurality of point trigger actuator portions 102 provides at least one pair of spaced-apart trigger actuator portions. For each one of the at least one pair of spaced-apart trigger actuator portions, a one of the pair of spaced-apart trigger actuator portions is spaced apart from the other one of the pair of the spaced-apart trigger actuator portions by a linear spacing distance "D1" of at least eight (8) inches, wherein the spacing distance is measured along an axis of the temperature responsive trigger actuator 100. In some embodiments, the temperature responsive trigger actuator 100, including the plurality of point trigger actuator portions 102, is long enough to encircle or run the length of a tank one or more times.

The heating of each one of the at least one operative point trigger actuator portion above the respective shape-changing temperature of each one of the at least one operative point trigger actuator portion effects a shape change of each one of the at least one operative point trigger actuator portion, such as a length reduction of each one of the at least one operative point trigger actuator portion, which effects an operative change in spatial disposition of the temperature responsive trigger actuator 100 (such as a reduction in length of the temperature responsive trigger actuator), which in turn effects the movement of the trigger 130 to the second trigger position and thereby removes the interference to the movement of the sealing member 160 from a one of the open position and the closed position to the other one of the open position and the closed position.

In some embodiments, the temperature responsive trigger actuator 100 includes the length-reducible actuator portion 106 which is configured to change its spatial disposition in response to application of heat. In this respect, the actuator 100 also includes the retained trigger actuator portion 104 which is coupled to any of the above-described implementations of the actuator retainer 50 which effects substantial fixing of the spatial disposition of the retained trigger actuator portion 104 relative to the body 20. As described above, the coupling of the actuator retainer 50 to the retained trigger actuator portion 104 of the temperature responsive trigger actuator 100 effects a resistance to a change in spatial disposition of the retained trigger actuator portion 104 such that the reduction in a length of the temperature responsive trigger actuator 100 effected by the heating of the temperature responsive trigger actuator translates to an operative change in the spatial disposition of the length-reducible trigger actuator portion 106 of the temperature responsive trigger actuator 100 which thereby effects the movement of the trigger 130 from the first trigger position to the second trigger position.

In some embodiments, the plurality of point trigger actuator portions 102 defines at least one continuous operative trigger material including a length of at least eight (8) inches, wherein the length is measured along the axis of the continuous operative trigger material.

In some embodiments, at least one of the plurality of point trigger actuator portions 102 includes a respective shaped memory alloy, including, for example, a shape-changing temperature of between 90 and 95 degrees Celsius. For example, a suitable shaped memory alloy is Nitinol.

In some embodiments, the temperature responsive trigger actuator 100 is a continuous operative trigger material in the form of a wire including a maximum diameter of 0.030 inches and a length of at least eight (8) inches, wherein the length is measured along an axis of the wire form of the continuous operative trigger material. In some embodiments, the wire is made from a shaped memory alloy, such as Nitinol wire. For example, the diameter of the wire is between 0.015 inches and 0.02 inches. For applications requiring a longer temperature responsive trigger actuator, a larger diameter wire is preferred.

In some embodiments, the temperature responsive trigger actuator 100 is configured to bend elastically upon the application of a bending force to form a bend of at least forty-five (45) degrees, such that upon the removal of the bending force, the temperature responsive trigger actuator 100 substantially returns to the shape which it had before the bending force shape was applied (i.e., the pre-bending force shape). "Elastically" bending means bending without permanently deforming. In some embodiments, the bend formed by the elastic bending of the actuator 100 is a bend of at least one hundred and thirty-five (135) degrees.

In some embodiments, the temperature responsive trigger actuator 100 is configured to assume a shape which conforms to an arcuate surface of a tank 200, and is configured to form at least one arc including a minimum radius of at least one (1) inch. This permits the temperature responsive trigger actuator 100 to be wrapped around or encircle a tank 200, of various sizes such as, for example, shown in FIGS. 9 and 10.

Second Aspect

In a second aspect, the temperature responsive trigger actuator 100 of the valve 10 includes at least one point trigger actuator portion 102. Each one of the at least one point trigger actuator portion 102 is characterized by a respective shape-changing temperature and is configured such that, for each one of the at least one point trigger actuator portion 102, when the temperature of the point trigger actuator portion 102 is below the respective shape-changing temperature, the point trigger actuator portion 102 is disposed in a respective low temperature shape condition, and when the temperature of the point trigger actuator portion 102 is at or above the respective shape-changing temperature, the point trigger actuator portion 102 is disposed in a respective high temperature shape condition.

Referring to FIGS. 2 and 5 of the first embodiment (FIGS. 10 and 12 of the second embodiment), the valve 10 also includes the actuator retainer 50. The actuator retainer 50 is fastened to a retained portion 104 of the temperature responsive trigger actuator 100 so as to effect substantial fixing of the spatial disposition of the retained actuator portion relative to the body and thereby effect a resistance to a change in spatial disposition of the retained portion relative to the body.

The valve 10 further includes a biasing member 120 which effects application of a force to the temperature responsive trigger actuator 100. For example, the biasing member is a resilient member, such as a spring 120, as depicted in FIGS. 2 and 5 of the first embodiment (FIGS. 10 and 12 of the second embodiment). For example, the spring 120 is a coil spring made from steel. For example, the spring 120 is disposed within space provided by the spring housing member 134 of the trigger 130 and is retained within space by spring retainer 122. Spring retainer 122 is fastened to the body 20. For example, the spring retainer 122 is made from metallic material, such as brass or stainless steel. For example, the spring retainer 122 is in the form of a nut which threads into complementary threads provide on an external surface of the body. The spring retainer 122 includes a passage 124 which slidably receives the temperature responsive trigger actuator 100 so as to facilitate operative disposition of the temperature responsive trigger actuator 100 relative to the trigger 130 (for example, the operative disposition is coupling of the temperature responsive trigger actuator 100 to the trigger 130) and also to facilitate movement of the temperature responsive actuator 100 in response to heating as described herein. For example, the connector 56 is fastened to the spring retainer 122, thereby effecting coupling of the connector 56 to the body 20. For example, fastening of the connector 56 is effected with a nut 562, which is threaded to the spring retainer, and which forces a ferrule 564 is to pinches the connector 56. In this respect, during assembly, the nut 562 and the ferrule 564 are slid over the end of the connector 56 which is desired to be fastened to the spring retainer 122 (and, therefore, the body). The connector 56 is then pushed through the passage 124 provided on the spring retainer 122. The nut 562 is then tightened until the ferrule 564 squeezes the connector 56.

The temperature responsive trigger actuator 100 co-operates with the actuator retainer 104 so as to effect opposition to the force applied by the biasing member 120 such that a resulting tensile force is applied to the temperature responsive trigger actuator 100 sufficient to effect a modification to the respective shape-changing temperature of at least one of the at least one point trigger actuator portion 102 so as to provide at least one shape-changing temperature modified point trigger actuator portion. Each one of the at least one shape-changing temperature modified point trigger actuator portion is a one of the at least one point trigger actuator portion 102, and each one of the at least one shape-changing temperature modified point trigger actuator portion includes a respective modified shape-changing temperature.

In some embodiments, the actuator retainer 50 is configured to be at least twice as stiff as the temperature responsive actuator, such that a tension applied to the temperature responsive trigger actuator 100 and resisted by the actuator retainer 50 changes the length of the actuator retainer 50 less than half as much as it changes the length of the temperature responsive trigger actuator 100, wherein the length of each one of the actuator retainer 50 and the actuator 100 is measured along a respective one of each other's axis.

The trigger 130 co-operates with the temperature responsive trigger actuator 100 such that the movement of the trigger 130 from the one of the open position and the closed position to the other one of the open position and the closed position is configured to be effected by heating of at least one operative shape-changing temperature modified point trigger actuator portion, wherein each one of the at least one operative shape-changing temperature modified trigger portion is any one of the at least one shape-changing temperature modified point trigger actuator portion 120, wherein the heating is sufficient to raise the temperature of each one of the at least one operative shape-changing temperature modified point trigger actuator portion above its respective modified shape-changing temperature.

In some embodiments, the coupling of the actuator retainer 50 to the retained actuator portion 104 of the temperature responsive trigger actuator 100 effects a resistance to a change in spatial disposition of the retained portion 50 such that the reduction in a length of the temperature responsive trigger actuator 100 effected by the heating of the temperature responsive trigger actuator translates to an operative change in the spatial disposition of the length-reducible actuator portion 106 of the temperature responsive trigger actuator 100 which thereby effects the movement of the trigger 130 from the first trigger position to the second trigger position.

Third Aspect

In a third aspect of the invention, the temperature responsive trigger actuator 100 of the valve 10 includes at least one point trigger actuator portion 102. Each one of the at least one point trigger actuator portion 102 is characterized by a respective shape-changing temperature and is configured such that, for each one of the at least one point trigger actuator portion 102, when the temperature of the point trigger actuator portion 102 is below the respective shape-changing temperature, the point trigger actuator portion 102 is disposed in a respective low temperature shape condition, and when the temperature of the point trigger actuator portion 102 is at or above the respective shape-changing temperature, the point trigger actuator portion 102 is disposed in a respective high temperature shape condition.

The trigger 130 co-operates with the temperature responsive trigger actuator 100 such that the movement of the trigger 130 from the first trigger position to the second trigger position is effected by heating of at least one operative point trigger actuator portion, wherein each one of the at least one operative point trigger actuator portion is any one of the at least one point trigger actuator portion 102, wherein the heating is sufficient to raise the temperature of each one of the at least one operative point trigger actuator portion above its respective shape-changing temperature so as to effect a reduction in a length of the temperature responsive trigger actuator 100.

The temperature responsive trigger actuator 100 includes the length-reducible trigger actuator portion 106 which is configured to change its spatial disposition in response to application of heat. The actuator 100 also includes the retained trigger actuator portion 104 which is coupled to any one of the above-described implementations of the actuator retainer 50 which effects substantial fixing of the spatial disposition of the retained trigger actuator portion 104 relative to the body 20. The coupling of the actuator retainer 50 to the retained trigger actuator portion 104 of the temperature responsive trigger actuator 100 effects a resistance to a change in spatial disposition of the retained portion 50 such that the reduction in a length of the temperature responsive trigger actuator 100 effected by the heating of the temperature responsive trigger actuator translates to an operative change in the spatial disposition of the length-reducible trigger actuator portion 106 of the temperature responsive trigger actuator 100 which thereby effects the movement of the trigger 130 from the first trigger position to the second trigger position.

At least a portion of the length-reducible actuator portion 106 is configured to form at least one arc with a minimum radius of at least one (1) inch. Alternatively, or in combination, at least a portion of the length-reducible actuator portion 106 is configured to elastically bend to form a bend of a least forty-five (45) degrees. For example, the formed bend is a bend of at least one hundred and thirty-five (135) degrees.

In some embodiments, the length of the length-reducible actuator portion 106 is at least eight (8) inches, wherein the length is measured along an axis of the temperature responsive trigger actuator 100.

Figure 1:
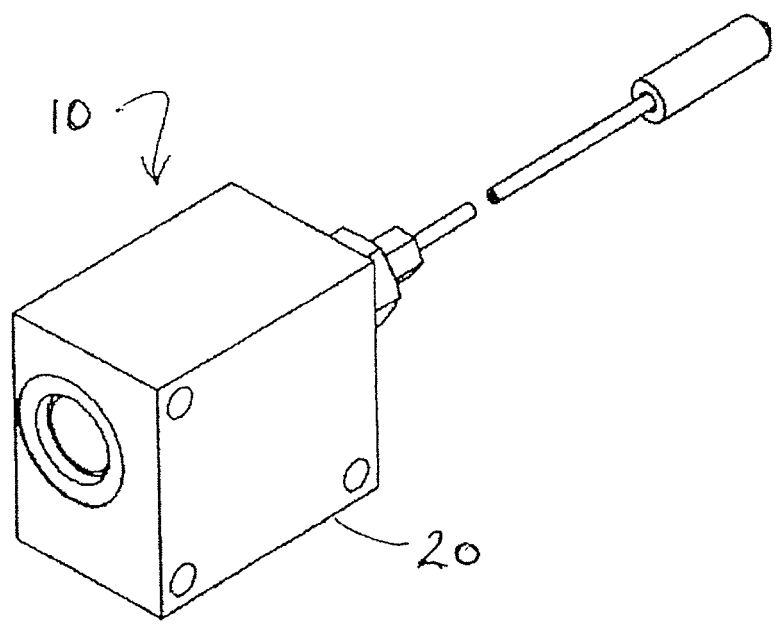
FIG. 1 is an isometric view of a first embodiment of a valve showing the temperature responsive trigger actuator partially in fragment.

In some embodiments, the connector 56 of the actuator 50 includes a protective cover portion 58. For example, the protective cover portion 58 is in the form of a hollow tube, conduit, cylinder, channel or sheath, as shown in FIGS. 1, 2 and 5 of the first embodiment (FIGS. 9, 10 and 12 of the second embodiment), whereas in other embodiments, the protective cover portion 58 includes a cross sectional "C" shape. In such embodiments, when the valve 10 is coupled to a tank 200, at least a portion of length-reducible actuator portion 106 is disposed between the protective cover portion 58 and the tank 200. Other variations on the shape of the protective cover portion 58 are possible. In some embodiments, the protective cover portion 58 is a semi-rigid tube, made from one or more of a number of materials including, but not limited to, metal. Suitable metallic material of the protective cover portion 58 includes copper, stainless steel, brass, or aluminium. For example, the protective cover portion 58 is in the form of a tube including an outside diameter of one-eighth (⅛) of an inch and an inside diameter of 0.065 inches, and is configured to receive a 0.015 inch diameter wire of the temperature responsive trigger actuator 100. As a further example, the protective cover portion 58 is in the form of a tube including an outside diameter of one-fourth (¼) of an inch and an inside diameter of 0.180 inches, and is configured to receive a 0.02 inch diameter wire of the temperature responsive trigger actuator 100.

In some embodiments, the protective cover portion 58 includes an outer layer and an inner layer. The outer layer is stiffer and more environmentally resistant than the inner layer. The greater stiffness facilitates mounting of the protective cover portion, as fewer retaining points are required. The greater environmental resistance means that the outer layer is at least one of resistant to abrasion, resistant to corrosion, or resistant to other chemical degradation. For example, a suitable material for the outer layer is stainless steel, such as 304 stainless steel or 316 stainless steel. The inner layer is more thermally conductive than the outer layer for effecting distribution of heat being applied to the trigger, along the length trigger 130. For example, a suitable material for the inner layer is copper.

In some embodiments, the protective cover portion 58 is configured to become plastically bent so as to assume a shape which conforms to an arcuate surface of a tank. For example, the protective cover portion 58 is configured to become plastically bent so as to form an arc including a minimum radius of one (1) inch. "Plastically" bending means bending to assume a bended shape which does not return to its original shape on its own (due to its own resiliency) without application of an external force.

An embodiment of the valve 10 attached to the tank 200 where the temperature responsive trigger actuator 100 and the protective cover portion 58 are long enough to encircle the tank 200 twice is illustrated in FIGS. 15 and 16.

In some embodiments, the protective cover portion 58 is configured to plastically bend at a bending point such that a first protective cover portion and a second protective cover portion is provided, wherein the first protective cover portion merges with the second protective cover portion at the bending point, and wherein the axis of the first actuator portion is at least disposed at an angle of between forty-five (45) degrees and one hundred and seventy-five (175) degrees relative to the axis of the second protective cover portion.

In some embodiments, the protective cover portion 58 is configured to plastically bend to form a bend of at least forty-five (45) degrees. In some embodiments the protective cover portion 58 is configured to plastically bend to form a bend of at least one hundred and thirty-five (135) degrees.

In some embodiments, the protective cover portion 58 is characterized by an internal shape, the internal shape being substantially maintained when the protective cover portion 58 is subjected to a compressive force.

Fourth Aspect

In a fourth aspect, the valve 10 includes a temperature responsive trigger actuator 100 including at least one point trigger actuator portion 102. Each one of the at least one point trigger actuator portion 102 is characterized by a respective shape-changing temperature and is configured such that, for each one of the at least one point trigger actuator portion 102, when the temperature of the point trigger actuator portion 102 is below the respective shape-changing temperature, the point trigger actuator portion 102 is disposed in a respective low temperature shape condition, and when the temperature of the point trigger actuator portion 102 is at or above the respective shape-changing temperature, the point trigger actuator portion 102 is disposed in a respective high temperature shape condition.

The valve 10 also includes a protective conduit 70 defining a passage 72, wherein the temperature responsive trigger actuator 100 is disposed within the passage 72.

The trigger 130 co-operates with the temperature responsive trigger actuator 100 such that the movement of the trigger 130 from the first trigger position to the second trigger position is effected by heating of at least one operative point trigger actuator portion, wherein each one of the at least one operative point trigger actuator portion is any one of the at least one point trigger actuator portion 102, wherein the heating is sufficient to raise the temperature of each one of the at least one operative point trigger actuator portion above its respective shape-changing temperature so as to effect a reduction in a length of the temperature responsive trigger actuator 100.

In some embodiments, the temperature responsive trigger actuator 100 is received within the passage 72.

In some embodiments, the reduction in a length of the temperature responsive trigger actuator 100 effects movement of the temperature responsive trigger actuator 100 through the passage 72.

In some embodiments, the temperature responsive trigger actuator 100 disposed or received within the passage 72 defines a protected temperature responsive trigger actuator portion 1100. The length of the protected temperature responsive trigger actuator portion 1100 is at least eight (8) inches, wherein the length is measured along an axis of the protected temperature responsive trigger actuator portion 1100.

In some embodiments, the valve 10 further includes any of the above-described implementations of the actuator retainer 50 which effects substantial fixing of the spatial disposition of the retained trigger actuator portion 104 relative to the body 20.

In this respect, the temperature responsive trigger actuator 100 includes the length-reducible trigger actuator portion 106 configured to change its spatial disposition in response to application of heat, and the retained trigger actuator portion 104 which is coupled to an actuator retainer 50. The coupling of the retained trigger actuator portion 104 to the actuator retainer 50 effects a resistance to a change in spatial disposition of the retained trigger actuator portion 50 such that the reduction in a length of the temperature responsive trigger actuator 100 effected by the heating of the temperature responsive trigger actuator translates to an operative change in the spatial disposition of the length-reducible trigger actuator portion 106 which thereby effects the movement of the trigger 130 from the first trigger position to the second trigger position. The length-reducible trigger actuator portion 106 includes the protected temperature responsive trigger actuator portion 1100.

As described above, in some embodiments, substantial fixing of the spatial disposition of the retained trigger actuator portion 104 relative to the body 20 by the actuator retainer 50 is effected by the coupling of the actuator retainer 50 to the body 20 of the valve 10. The actuator retainer 50 is coupled to the body 20 of the valve 10 with the connector 56 and, in some embodiments, the connector includes the protective conduit 70.

In some embodiments, the protective conduit 70 is configured to shield or protect the protected temperature responsive trigger actuator portion 1100 from external forces, such as pushing, pulling or tearing forces.

In some embodiments, the above-described connector 56 includes the protective conduit 70. In some embodiments, the protective cover portion 58 includes the protective conduit 70.

Some embodiments of the valve 10 may incorporate one, two three, or all four of the aspects of the inventions described herein, including any and all of the described variations and any combinations thereof. It will be understood of course that modifications and alterations can be made to the embodiments described herein, and all such modifications and alterations are within the sphere and scope of the present invention as defined in the attached claims.

What is claimed is:

1. A valve comprising:
  a body;
  a passageway defined by the body, wherein the passageway includes an inlet and an outlet;
  a sealing member configured for movement between a closed position and an open position, wherein in the closed position, the sealing member prevents fluid communication between the inlet and outlet of the passageway, and in the open position, the inlet and the outlet of the passageway are in fluid communication;
  a trigger configured for movement between a first trigger position and a second trigger position, wherein the trigger cooperates with the sealing member such that, when the trigger is disposed in the first trigger position, the trigger effects interference with movement of the sealing member from one of the open position and the closed position to the other one of the open position and the closed position, and when the trigger becomes disposed in the second trigger position, the interference, effected by the trigger, to the movement of the sealing member from the one of the open position and the closed position to the other one of the open position and the closed position, is removed;
  a temperature responsive trigger actuator including a trigger actuator portion;
  a shape-changing temperature modifier which effects application of a tensile force to the temperature responsive trigger actuator sufficient to effect a modification to a shape-changing temperature of the trigger actuator portion such that the trigger actuator portion is characterized by a modified shape-changing temperature and is configured such that when the temperature of the trigger actuator portion is below the modified shape-changing temperature, the trigger actuator portion is disposed in a respective low temperature shape condition, and when the temperature of the trigger actuator portion is at or above the respective shape-changing temperature, the trigger actuator portion is disposed in a respective high temperature shape condition,
  wherein the trigger co-operates with the temperature responsive trigger actuator such that the movement of the trigger from the closed position to the open position is configured to be effected by heating of the trigger actuator portion, wherein the heating is sufficient to raise the temperature of the trigger actuator portion above its modified shape-changing temperature.

2. The valve as claimed in claim 1,
  wherein the shape-changing temperature of the trigger actuator portion prior to the modification by the shape-changing operative modifier is between 90 and 95 degrees Celsius, and wherein the modification to the shape-changing temperature of the trigger actuator portion is an increase to above 95 degrees Celsius.

3. The valve as claimed in claim 1, further comprising an actuator retainer coupled to a retained trigger actuator portion of the temperature responsive trigger actuator so as to effect substantial fixing of the spatial disposition of the retained trigger actuator portion relative to the body and thereby effect a resistance to a change in spatial disposition of the retained trigger actuator portion relative to the body such that the reduction in a length of the temperature responsive trigger actuator, effected by the heating of the trigger actuator portion, translates to an operative change in the spatial disposition of a length-reducible trigger actuator portion of the temperature responsive trigger actuator which thereby effects the movement of the trigger from the first trigger position to the second trigger position.

4. The valve as claimed in claim 3, wherein the trigger actuator portion includes a shaped memory alloy.

5. The valve as claimed in claim 4, wherein the temperature-responsive trigger actuator is in the form of a wire.

6. The valve as claimed in claim 5, wherein the wire has a diameter of between 0.015 inches and 0.02 inches.

7. The valve as claimed in claim 1, wherein the trigger actuator portion includes a shaped memory alloy.

8. The valve as claimed in claim 7, wherein the temperature-responsive trigger actuator is in the form of a wire.

9. The valve as claimed in claim 8, wherein the wire has a diameter of between 0.015 inches and 0.02 inches.

10. A valve comprising:
a body;
a passageway defined by the body, wherein the passageway includes an inlet and an outlet;
a sealing member configured for movement between a closed position and an open position, wherein in the closed position, the sealing member prevents fluid communication between the inlet and outlet of the passageway, and in the open position, the inlet and the outlet of the passageway are in fluid communication;
a trigger configured for movement between a first trigger position and a second trigger position, wherein the trigger cooperates with the sealing member such that, when the trigger is disposed in the first trigger position, the trigger effects interference to movement of the sealing member from one of the open position and the closed position to the other one of the open position and the closed position, and when the trigger becomes disposed in the second trigger position, the interference, effected by the trigger, to the movement of the sealing member from the one of the open position and the closed position to the other one of the open position and the closed position, is removed;
a temperature responsive trigger actuator including a temperature-responsive trigger actuator portion;
an actuator retainer coupled to a retained trigger actuator portion of the temperature responsive trigger actuator so as to effect substantial fixing of the spatial disposition of the retained trigger actuator portion relative to the body and thereby effect a resistance to a change in spatial disposition of the retained trigger actuator portion relative to the body; and
a biasing member which effects application of a force to the temperature responsive trigger actuator, wherein the temperature responsive trigger actuator co-operates with the actuator retainer so as to effect opposition to the force applied by the biasing member such that a resulting tensile force is applied to the temperature responsive trigger actuator sufficient to effect a modification to shape-changing temperature of the temperature-responsive trigger actuator portion such that the temperature-responsive trigger actuator portion is characterized by a modified shape-changing temperature, and is configured such that when the temperature of the temperature-responsive trigger actuator portion is below the respective shape-changing temperature, the temperature-responsive trigger actuator portion is disposed in a respective low temperature shape condition, and when the temperature of the temperature-responsive trigger actuator portion is at or above the respective shape-changing temperature, the temperature-responsive trigger actuator portion is disposed in a respective high temperature shape condition;
wherein the trigger co-operates with the temperature responsive trigger actuator such that the movement of the trigger from the one of the open position and the closed position to the other one of the open position and the closed position is configured to be effected by heating of the temperature responsive trigger actuator portion, wherein the heating is sufficient to raise the temperature of the temperature-responsive trigger actuator portion above its modified shape-changing temperature.

11. The valve as claimed in claim 10,
wherein the shape-changing temperature of the temperature responsive trigger actuator portion, prior to the modification, is between 90 and 95 degrees Celsius, and wherein the modification to the shape-changing temperature of the temperature responsive trigger actuator portion is an increase to above 95 degrees Celsius.

12. The valve as claimed in claim 10, wherein the biasing member is a resilient member.

13. The valve as claimed in claim 10, wherein the reduction in a length of the temperature responsive trigger actuator, effected by the heating of the temperature responsive trigger actuator, translates to an operative change in the spatial disposition of a length-reducible trigger actuator portion of the temperature responsive trigger actuator which thereby effects the movement of the trigger from the first trigger position to the second trigger position.

14. The valve as claimed in claim 13, wherein the trigger actuator portion includes a shaped memory alloy.

15. The valve as claimed in claim 14, wherein the temperature-responsive trigger actuator is in the form of a wire.

16. The valve as claimed in claim 15, wherein the wire has a diameter of between 0.015 inches and 0.02 inches.

17. The valve as claimed in claim 10, wherein the trigger actuator portion includes a shaped memory alloy.

18. The valve as claimed in claim 17, wherein the temperature-responsive trigger actuator is in the form of a wire.

19. The valve as claimed in claim 18, wherein the wire has a diameter of between 0.015 inches and 0.02 inches.

* * * * *